Nov. 1, 1966   H. A. McMASTER   3,282,447
CONVEYING APPARATUS
Original Filed Dec. 5, 1963   2 Sheets-Sheet 1

INVENTOR.
Harold A. McMaster
BY
Barnard, McGlynn & Reising
ATTORNEYS

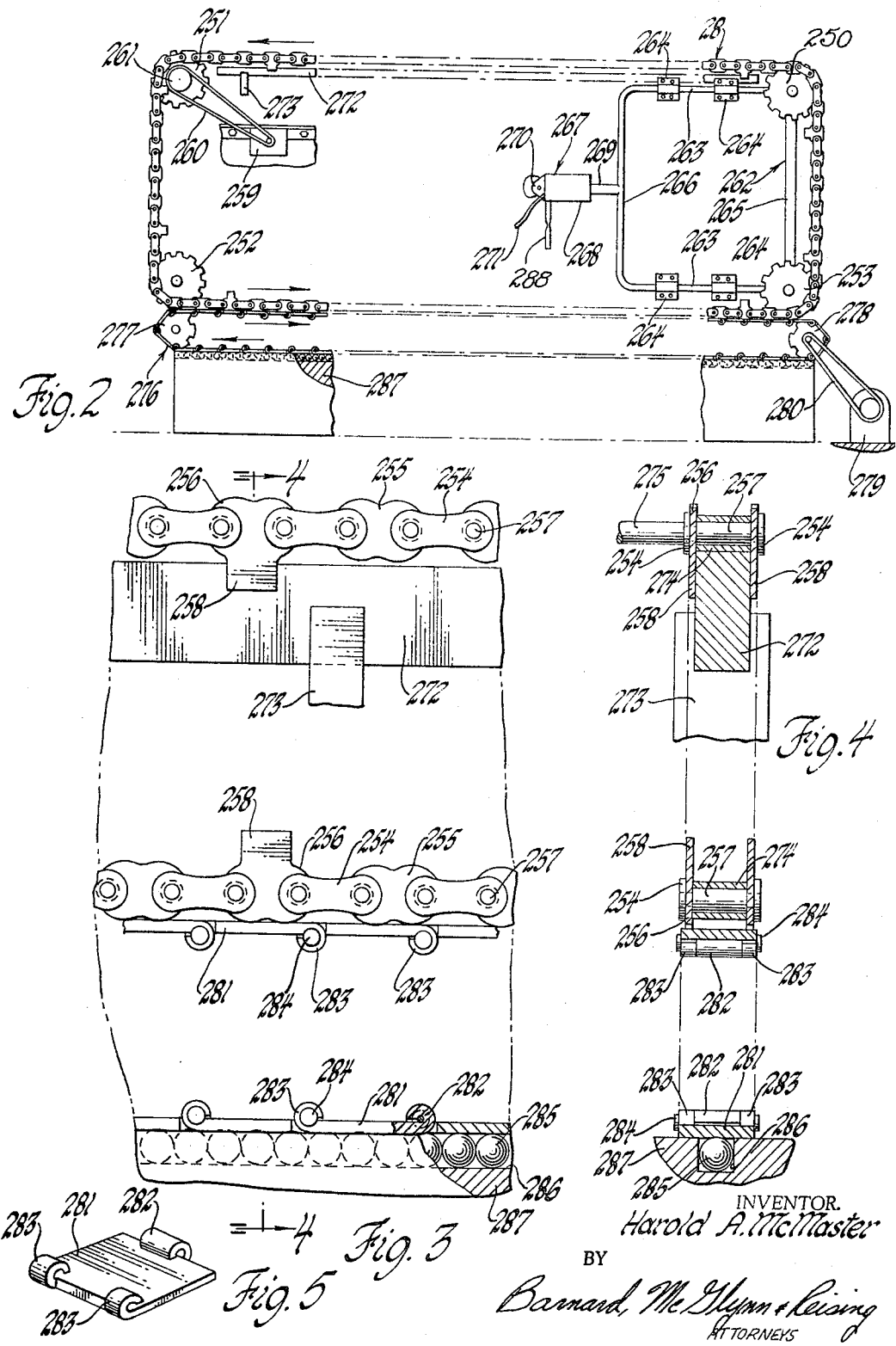

United States Patent Office 3,282,447
Patented Nov. 1, 1966

3,282,447
CONVEYING APPARATUS
Harold A. McMaster, Woodville, Ohio, assignor to Permaglass, Inc., Woodville, Ohio, a corporation of Ohio
Continuation of application Ser. No. 328,222, Dec. 5, 1963. This application July 15, 1965, Ser. No. 478,521
22 Claims. (Cl. 214—21)

This application is a continuation of application Serial Number 328,222 filed December 5, 1963, now abandoned.

This invention relates to a heating apparatus and more particularly to improved conveyor means for furnaces of the type disclosed in United States patent application Serial Number 326,713 filed November 29, 1963, in the names of Harold A. McMaster and Norman C. Nitschke and assigned to the assignee of the present invention.

In the aforesaid United States patent application there is disclosed and claimed an improved method and appartus for manufacturing curved tempered glass sheets on a continuous basis. In accordance with that invention, the glass sheets to be tempered are moved along an elongate perforated bed which extends through a heating furnace and then through a cooling blasthead, the surface of the bed within the furnace being shaped to provide the shape desired of the glass sheets. The glass sheets are floated on the bed portion within the furnace by hot gases emitted from the perforations therein, the gas temperature being at or above the deformation temperature of the glass. Hence, by the time the glass sheets leave the furnace they have been heated by the hot gases to deformation temperature such that they conform to the contour of the bed. The hot glass sheets then float through the blasthead where they are cooled by and supported by room temperature air emitted from that portion of the bed within the blasthead.

In transporting the glass sheets across the bed, it is extremely important that no contact whatever be made between the glass sheets and the bed itself. Furthermore, the conveying means must be such as to avoid scratching, marring, or marking the glass sheets as they convey the glass sheets across the bed. When glass is tempered, it is extremely difficult and expensive to remove scratches, mars, or marks by polishing or in any other manner. To this end it is necessary to provide a conveying means for the glass sheet that will maintain as little contact with the glass sheet as is possible. Since the conveying means passes through the heated furnace and then through the cooling blasthead, temperature changes causing expansion and contraction problems will be experienced. Additionlly, most conveyor means such as chains, belts or the like have a degree of vibration and slack which cause an intermittent movement of the conveyor means.

Hence, it is a principal object of the present invention to provide an improved apparatus for conveying curved sheets of glass or the like efficiently and at relatively low cost. More specifically, it is an object of the invention to provide apparatus of the type described whereby transportation of sheets or the like of exceptionally high quality can take place on a continuous high production basis at relatively low cost with very low scrap or breakage losses. These along with other objects, features, and advantages of the invention will become more apparent from the following detailed description of a preferred embodiment thereof made with reference to the drawings in which:

FIGURE 2 is an enlarged elevational view with parts broken away and in section showing the conveyor means for the glass sheets in the furnace apparatus illustrated in FIGURE 1.

FIGURE 3 is an enlarged elevational view of the conveyor means illustrated in FIGURE 2 showing the position of the various parts.

FIGURE 4 is a cross sectional view of the conveyor means of FIGURES 2 and 3 taken substantially along the line 4—4 of FIGURE 3 and looking in the direction of the arrows.

FIGURE 5 is an isometric view of one link of a chain such as might be used in the conveyor means of FIGURES 1 through 4.

Figure 1:
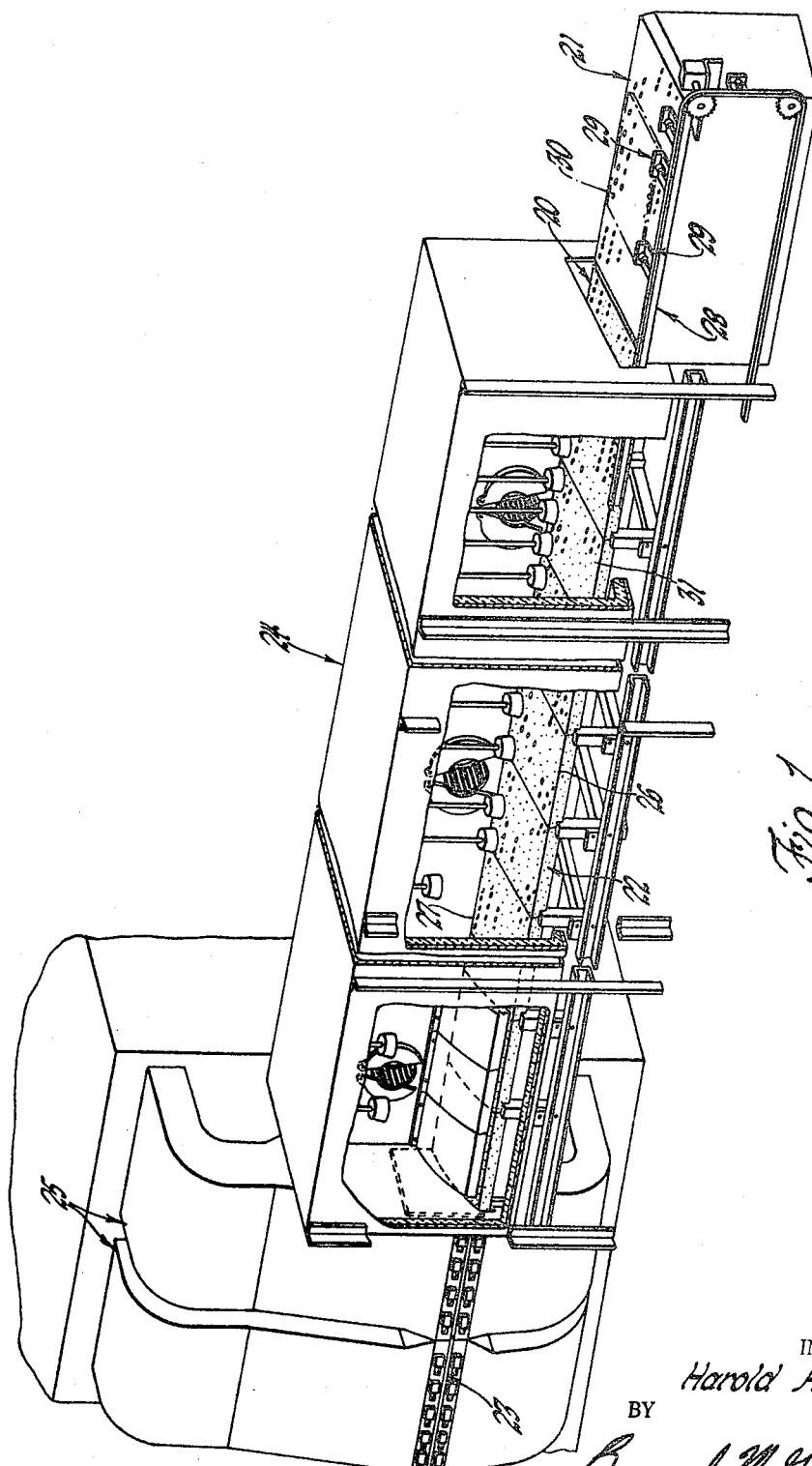
FIGURE 1 is a perspective view, with parts broken away and partially schematic, of the preferred apparatus and illustrates the bed configuration into and through the heating furnace wherein the glass sheets are curved, and into and through blasthead wherein the curved glass sheets are tempered.

Referring now to FIGURE 1, the apparatus shown comprises an elongate perforated bed, illustrated generally by the numeral 20, which in the actual embodiment herein shown is about 180 feet long and is composed of three main sections. These sections include a loading section 21, a heating and bending section 2, and a tempering section 23. The heating and bending section 22 is within and constitutes the floor of an elongate furnace structure, illustrated generally by the numeral 24, and tempering section 23 extends through a cooling blasthead, illustrated generally by the numeral 25. The bed is flat throughout section 21 and most of section 22, and approximately two-thirds of the way through section 22 gradually becomes curved in a direction transverse to the longitudinal axis of the bed. Bed section 23 within the blasthead 25 and the portion of section 22 toward the end of the furnace adjacent the blasthead have a uniform transverse curvature the same as that desired of the glass sheets to be manufactured. The plane of the bed is tilted about the longitudinal axis thereof to an angle of about 12° to the horizontal; and hence the left longitudinal edge of the bed, as shown at 26, is lower than the right edge 27. A chain conveyor, illustrated generally by the numeral 28, carrying spaced pairs of glass sheet support pads 29, serves to move the glass sheets over the bed 20 from the loading section 21 through the furnace 24 and through out the blasthead 25. Gas emmited from perforations in the bed 20 provide a film or cushion of gas on the bed for floatation of the glass sheets thereover in a manner more clearly shown and described in the aforementioned United States patent application Serial Number 326,713. In essence and without attention at this time to the details described in the aforesaid application, which details are incorporated herein by reference, the apparatus operates as follows: The glass sheets 30 to be curved and tempered are placed onto the bed at loading section 21 with the bottom edge of each sheet resting on a pair of pads 29 secured to the conveyor chain 28. The glass sheets are conveyed by the chain and float over the bed out of contact therewith by reason of the gas emitted from the perforations in the bed. The floating gas sheets are thus guided through the furnace 24 where they are heated to deformation temperature by the hot gases emitted from the bed perforations and as they reach the curved portion of section 22, the sheets sag under gravity to conform to the curvature thereof, all the while supported on gas out of contact with the bed. Hence, when the sheets reach the end of the furnace, they are shaped with the full curvature desired. Transportation of the floating heated curved glass sheets then continues through the blasthead 25 where they are tempered by the cooling air projected from the bed perforations in the blasthead.

It will be apparent from the foregoing that it is highly desirable to provide a conveyor means which is not subject to changes due to expansion and contraction caused by heat in the furnace. The conveyor means must also pass through the furnace the length of the bed 20 and, as such, passes through the hot portion of the furnace and through the cooler blasthead. Under such conditions, the conveyor chain 28 is subject to expansion and contraction due to the heat and cold causing variations in the length of the chain throughout the assembly. Also, conveyor chains of the type illustrated in the accompanying drawings are subject to tolerance stackup in the manufacture and assembly thereof, the tolerances being sufficient to cause a certain amount of slack and vibration in the chain as it travels along its circuit. Such expansions and contractions, vibrations, and slack conditions all contribute to the possiblity of improper movement of the glass sheets and the consequential marking or marring of the edges of the sheet, as well as the possibility of heat streaks therein as the glass sheet is moved along the bed 22, unless such problems are eliminated.

Referring now to FIGURES 2 through 5 of the drawings, a conveyor system is shown which avoids these problems. Suitably mounted on the apparatus, or adjacent thereto, are four sprockets 250, 251, 252 and 253. These sprockets are pivotally mounted in a manner to become hereinafter more apparent and are provided with a series of teeth to receive and drive the chain 28 extending along the length of the loading station, the furnace 24, and the blasthead 25. Around all four of the sprockets the chain 28 is entrained. The upper sprockets 250 and 251 are disposed such that the upper or driving reach of the chain 28 will be disposed adjacent the edge of the bed 22 for suitable engagement with the glass sheets. The lower sprockets 252 and 253 are so located as to space the lower or driven reach of the chain 28 a suitable distance away from the driving reach.

Chain 28 may be of any suitable construction and is shown for purposes of illustration and description as being comprised of a series of three types of connected links of which links 254, 255, and 256 are typical. The links are connected by suitable pivot pins 257 which permit pivotal movement of the successive links as the chain passes over the various sprockets. Links 256 are located at spaced points along the length of the chain 28 and include inwardly depending flanges 258 for purposes to become hereinafter more apparent. The spacing of links 256 within the chain 28 may be in any suitable pattern sufficient to accomplish the purpose desired.

Sprockets 251 and 252 are mounted directly on the apparatus and one of the sprockets, such as sprocket 251, at the downstream or outlet end of the apparatus, is driven by suitable constant speed drive means. An electric motor 259, located adjacent the sprocket 251, may drive sprocket 251 by means of a belt or the like 260. A pulley 261, attached or integrally formed from sprocket 251, receives the belt 260 for drive of the sprocket and the chain 28.

Sprockets 250 and 253 are rotatably mounted on a frame structure, indicated generally by the numeral 262, which is slidable longitudinally of the chain 28. Frame structure 262 includes side members 263 slidably disposed in bearings 264 conveniently mounted on the apparatus. End members 265 and 266 separate side members 263 and complete the frame structure. Sprockets 250 and 253 are secured to either or both the side members 263 and end members 265, however is convenient. Suitably attached to end member 266 is a piston assembly 267, including a cylinder 268 having a piston (not shown) reciprocable therein and a piston rod 269 extending therefrom. Cylinder 268 is suitably fixed to the apparatus as at 270 and fluid under pressure is admitted to cylinder 268 through a tube or conduit 271. Suitable fluid outlet means 288 on the opposite side of the piston in cylinder 268 is provided, to exhaust pressure therefrom and permit movement of the piston. If desirable, the outlet means may be restricted to restrict the flow therefrom and damp vibrations in the chain, sprockets 250 and 253 and in the frame structure 262. Thus, constant pressure is maintained at all times on the frame structure 262 to urge the sprockets 250 and 253 in a chain tightening direction. The result is to take up vibrations, slack, tolerances and thermal expansions and contractions in the chain 28.

Of course, it is to be understood that other pressure applying means could be used to act against frame 263, instead of piston assembly 267. For example, a suitable compression spring could be used to apply the necessary force.

Adjacent the edge of the bed 22 and within the furnace 24 and blasthead 25 is a rail 272 which may be suitably mounted to the bed supporting means by posts 273 and brackets, not shown. Rail 272 may be formed of a plurality of sections, closely spaced but separated a slight amount so that expansion and contraction of the rail sections within the furnace will not adversely affect their direction. The rails are longitudinally aligned and are of such width as to receive the flanges 258 extending from the spaced links 256 in the chain 28. The flanges 258 straddle the rail 272 and thus serve to maintain the chain 28 in its proper relationship relative to the edge of the bed 22. Suitable tubular spacers 274 extending between the opposed links of the chain 28 also serve as bearing surfaces over the rail 272 for best operation of the chain.

The glass support pads 29 extend from chain 28 and are mounted on suitable rods or the like 275 secured on the chain 28 in any convenient manner and at spaced points therealong. The support pads 29 engage the edges of the glass sheets with minimal contact and are more clearly described in the aforementioned United States Patent Application Serial Number 326,713.

In order to assist the movable sprockets 250 and 253, and the frame structure 262 in maintaining the chain 28 in a taut condition, a second continuous chain device, illustrated generally by the numeral 276, is provided. Chain 276 is entrained around sprocket members 277 and 278 suitably located below the chain 28 in such a manner that the upper or driving reach of the chain 276 is in engagement with the lower or driven reach of the chain 28. Sprocket 278 at the upstream or inlet end of the apparatus is driven by a constant speed drive means, such as motor 279 connected to the sprocket 278 by means of a belt or the like 280. Chain 276 is driven at a slightly greater speed than the speed of chain 28 and thus tends to take up the slack, vibrations, and expansions and contractions in the chain 28.

Chain 276 may be constructed in any suitable manner and is shown for purposes of illustration and description to be formed of a series of flat plates 281, all of which are identical. One end of each of plates 281 is rolled, as at 282, to form a pivot pin receiving bore therein. The opposite ends of each of the plate members 281 are provided with spaced ears 283, rolled in a similar manner and adapted to straddle the tab 282 on the next adjacent plate 281. Suitable pivot pins or the like 284 extend through the ears 283 on one plate member and through the tab 282 on the next adjacent plate member to form a continuous belt of such plates. When formed in such manner, the chain 276 has a flat outer surface which frictionally engages the links of the chain 28 along the driven reach thereof. Such frictional engagement tends to draw the chain 28 and take up the vibration, expansion and contraction, and slack that develop in the chain.

The driven reach of chain 276 may be provided with anti-friction means if desired, and for purposes of illustration and description, such means are shown to include a plurality of ball bearings 285 suitably disposed in a groove 286 formed in a supporting structure 287 below the driven reach of chain 276. Such balls 285 may be of the recirculating type if such is desirable and the smooth outer surface of chain 276 riding across the balls 285 provides minimal contact to maintain the chain 276 in as constant motion as possible.

With the chain 28 operating as above described and taking advantage of the movable sprockets 250 and 253 and lower chain 276, it is apparent that the glass sheets will be moved along the support bed 22 with as little vibration as possible, consistent with manufacturing limits, tolerances and the like. The chain 28 is properly directed adjacent the bed 22 by means of the rail sections 272, and thus no inward or outward movement relative to the bed 22 is possible. The lower chain moves slack in the upper chain toward the sprockets 250 and 253 where it is taken up by the piston and movable frame assembly 262. Further, since the lower chain moves the bottom reach of the upper chain toward sprockets 253 and 250, the upper reach of the upper chain 28 is relieved of the job of pulling the bottom reach thereof toward said sprockets 253 and 250. This is an important advantage since the upper reach of chain 28, being in the furnace, is extremely hot and subject to elongation if excessive tension is applied thereto.

It will be understood that whereas in the preferred embodiment shown a pair of sprockets is used at each end of chain 28, only a single sprocket at each end of the chain need be used. Hence, although the foregoing description and drawings illustrate a preferred embodiment of the invention, it is apparent that modifications and alterations thereto will occur to those having skill in the art after having had reference to the foregoing description and drawings. However, it is not desired to limit the invention by the foregoing but by the scope of the appended claims in which:

The embodiments of the invention in which an exclusive property or privilege is claimed are defined as follows.

1. In a material treating apparatus having a material inlet toward one end thereof and a material outlet toward the other end thereof, a conveyor for guiding the material through said apparatus comprising: a rotatable member positioned adjacent the outlet end of said apparatus, a rotatable member positioned adjacent the inlet end of said apparatus, a first continuous loop entrained around said rotatable members with a reach thereof in said apparatus, drive means for rotating one of said rotatable members to thereby drive said first loop, means biasing one of said rotatable members in a loop tightening direction to lessen the slack and vibrations in said first loop, a second continuous loop mounted adjacent the driven reach of said first loop with the driving reach of the second loop in engagement with the driven reach of said first loop, and drive means for driving said second loop at a speed slightly greater than the speed of said first loop to assist in taking up slack and vibrations in said first loop.

2. Apparatus as set forth in claim 1 and further including anti-friction means disposed adjacent the driven reach of said second loop and in engagement therewith.

3. Apparatus as set forth in claim 2 wherein said anti-friction means includes a row of ball bearings extending the length of said driven reach of said second loop.

4. Apparatus as set forth in claim 1 wherein there are at least two rotatable members positioned adjacent the inlet end of said apparatus and wherein said biasing means comprises a frame slidably mounted on said apparatus and having said two rotatable members rotatably secured thereto and a hydraulic cylinder and piston assembly secured to said apparatus and operatively connected to said frame, said assembly being actuatable to bias said frame in a loop tightening direction.

5. Apparatus as set forth in claim 1 wherein the drive means for said first loop is a constant speed motor and wherein the drive means for said second loop is also a constant speed motor.

6. Conveyor means for use with an apparatus and comprising: a plurality of sprockets rotatably mounted adjacent said apparatus; a continuous chain entrained around said sprockets and adapted to move an object along said apparatus; drive means operatively connected to one of said sprockets and operable to rotate said one of said sprockets and drive said chain; a continuous member mounted adjacent the driven reach of said chain and with the driving reach thereof in engagement with the driven reach of said chain; and means for driving said continuous member such that the driving reach thereof travels in the same direction as the driven reach of said chain and at a speed slightly greater than the speed of said chain to take up vibrations and slack in said chain and maintain the speed of said chain constant and uninterrupted.

7. The conveyor means of claim 6 wherein said chain includes a plurality of links rotatably secured together by pivot means.

8. The conveyor means set forth in claim 7 wherein a rail extends along the length of said apparatus and adjacent the driving reach of said chain, and said chain, being provided with spaced links extending toward and engaging said rail to properly direct said driving reach of said chain.

9. The conveyor means set forth in claim 8 and further including anti-friction means disposed adjacent the driven reach of said second member and in engagement therewith to maintain constant movement thereof.

10. The conveyor means set forth in claim 9 wherein said anti-friction means includes a row of ball bearings extending the length of said driven reach of said second member and in engagement therewith.

11. The conveyor means set forth in claim 6 wherein said drive means for said one sprocket and said one sprocket are disposed adjacent the end of the driving reach of said chain, and said means for driving said continuous member are disposed adjacent the end of the driving reach of said continuous member.

12. The conveyor means set forth in claim 11 wherein said drive means for said one sprocket and said means for driving said continuous member apply constant speed drives for said one sprocket and said continuous member respectively.

13. The conveyor means set forth in claim 6 and further including a frame structure rotatably mounting a pair of said sprockets at the end of said chain remote from said drive means for said chain, said frame structure being slidably mounted on said apparatus, and means tending to move said frame structure and said pair of sprockets in a chain tightening direction.

14. The conveyor means set forth in claim 13 wherein said means tending to move said frame structure includes a hydraulic cylinder secured to said apparatus and having fluid inlet and outlet means therein, said cylinder having a piston reciprocable therein and operably connected to said frame stucture for moving said structure and said pair of sprockets in response to fluid pressure in said cylinder.

15. The conveyor means set forth in claim 14 wherein said fluid outlet means is restricted to restrict fluid flow therefrom and damp vibrations in said chain and said frame structure and said pair of sprockets.

16. In an elongate materials treating apparatus having a material inlet at one end thereof and a material outlet at the other end thereof, a conveyor for guiding said material through at least a portion of said apparatus comprising a closed loop extending longitudinally of said apparatus between said inlet and said outlet, a driving rotary member in engagement with said loop and positioned toward said outlet, an idler rotary member in engagement with said loop and positioned toward said inlet, means biasing said idler rotary member in a direction away from said driving rotary member to thereby reduce the amount of slack in said loop, a second closed loop extending parallel to said first mentioned loop with a portion thereof in engagement with said first mentioned loop, a driving rotary member in engagement with said second mentioned loop positioned toward the inlet end of said apparatus and idler rotary member in engagement with said second mentioned loop positioned toward the outlet end of said apparatus, said loops being driven in opposite rotary directions, said second mentioned loop being driven slightly faster than said first mentioned loop whereby said second mentioned loop urges any slack in that portion of the first mentioned loop with which it is in engagement toward the idler rotary member for said first mentioned loop and attenuates vibrations in said first mentioned loop.

17. Apparatus as set forth in claim 16 wherein each of said driving rotary members has its own constant speed drive means.

18. Apparatus for treating articles comprising; a furnace, a conveyor for moving articles through said furnace, said conveyor including a continuous loop having a driving reach and a driven reach, said driving reach extending through said furnace, a first drive means for moving said loop, a second drive means for driving said loop, said second drive means engageable with said loop for urging said loop to move at a faster speed than said loop is moved by said first drive means, and means for allowing slippage between said second drive means and said loop thereby to inhibit slack and vibrations in said loop so that the speed of said driving reach is substantially constant.

19. Apparatus for treating articles comprising; a furnace, a conveyor for moving the articles through said furnace at a substantially constant speed, said conveyor including a continuous loop having a driving reach and a driven reach, said driving reach extending through said furnace, said conveyor being entrained about a first drive means for driving said loop and an idler means for biasing said loop in a loop tension increasing direction, a second drive means engagable with said driven reach of said loop as said loop moves from said drive means to said idler means for urging said driven reach of said loop to move at a faster speed than said driving reach of said loop, and means for allowing slippage between said second drive means and said driven reach of said loop thereby to inhibit slack and vibrations in said loop so that the speed of said driving reach of said loop is substantially constant.

20. Apparatus for conveying an article comprising a continuous member forming an elongated loop entrained around and having two reaches extending between spaced rotatable members, means adjacent one end of said elongated loop for driving said loop, means adjacent the other end of said elongated loop for tensioning said loop, said loop having means for contacting the article and moving it with one of the reaches of said loop, and means for urging the other reach of said loop in the direction of said tensioning means.

21. Apparatus for conveying an article comprising a continuous member forming an elongated loop entrained around and having two reaches extending between spaced rotatable members, drive means associated with one of said rotatable members at one end of said elongated loop for driving said loop, tensioning means at the other end of said elongated loop associated with the other of said rotatable members for tensioning said loop, said loop having means for contacting the article and moving it with one of the reaches of said loop, and means urging the other reach of said loop in the direction of said tensioning means.

22. Apparatus for conveying spaced sheets while said sheets are supported on gas comprising a continuous member forming an elongated loop entrained around and having two reaches extending between spaced rotatable members, means adjacent one end of said elongated loop for driving said loop, spaced supports extending laterally from said loop for frictionally engaging said sheets laterally of one reach of said loop whereby said sheets are caused to move with said loop laterally of said one reach, means adjacent the other end of said elongated loop for tensioning said loop and means urging the other reach of said loop in the the direction of said tensioning means.

References Cited by the Examiner

UNITED STATES PATENTS

| 2,103,680 | 12/1937 | Klaucke | 198—189 |
| 2,295,401 | 9/1942 | Hansen | 214—21 |
| 2,650,695 | 9/1953 | Robins | 198—208 |
| 2,797,075 | 6/1957 | Wilbur | 198—208 X |
| 2,868,356 | 1/1959 | Haaf | 198-203 |
| 2,925,165 | 2/1960 | Rake | 198—198 |
| 3,039,597 | 6/1962 | Merchant | 198—208 |
| 3,086,824 | 4/1963 | Barkley | 308—6 |

FOREIGN PATENTS 622,748   3/1963   Belgium.

GERALD M. FORLENZA, *Primary Examiner.*

R. G. SHERIDAN, *Assistant Examiner.*